United States Patent Office 2,724,302
Patented Nov. 22, 1955

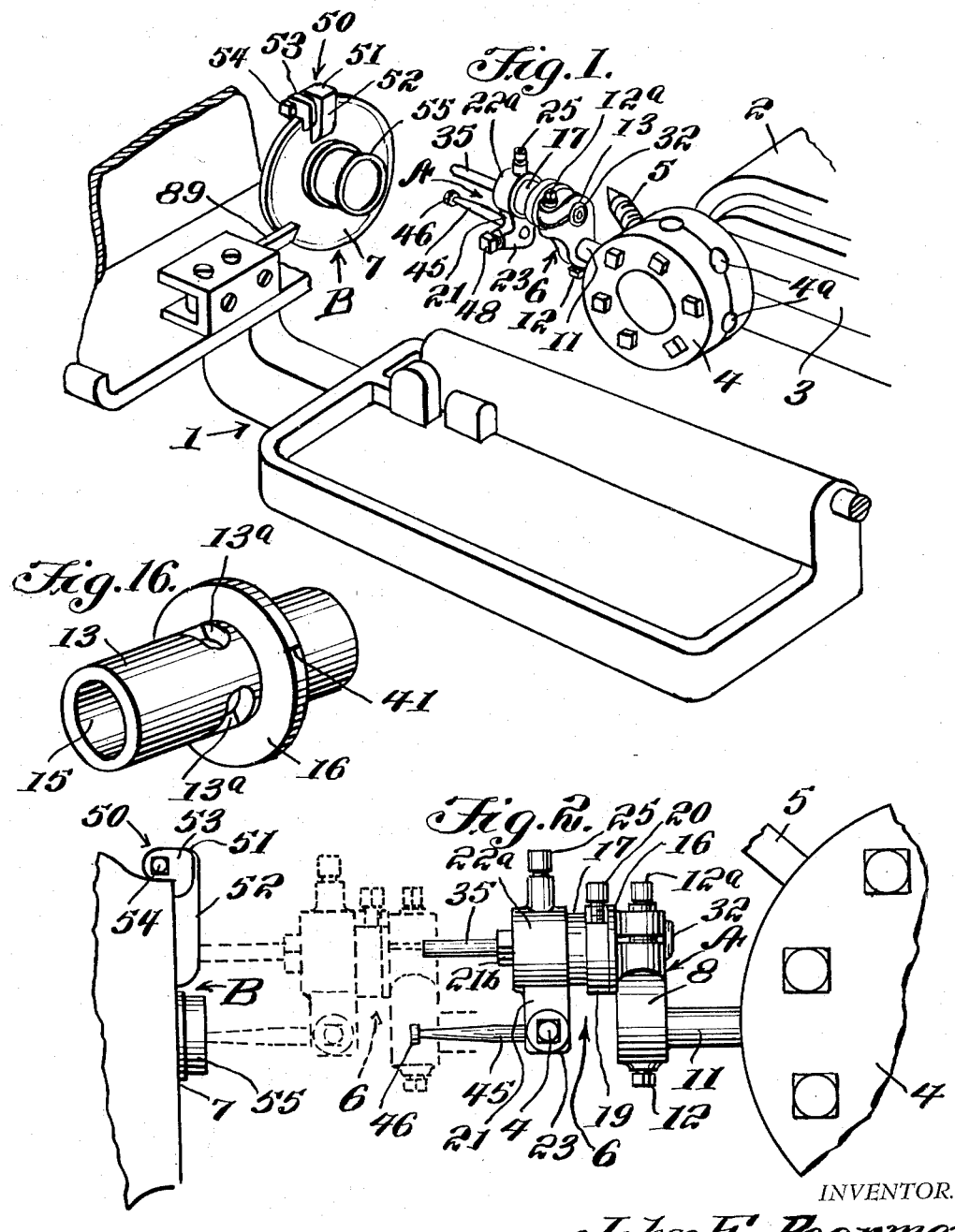

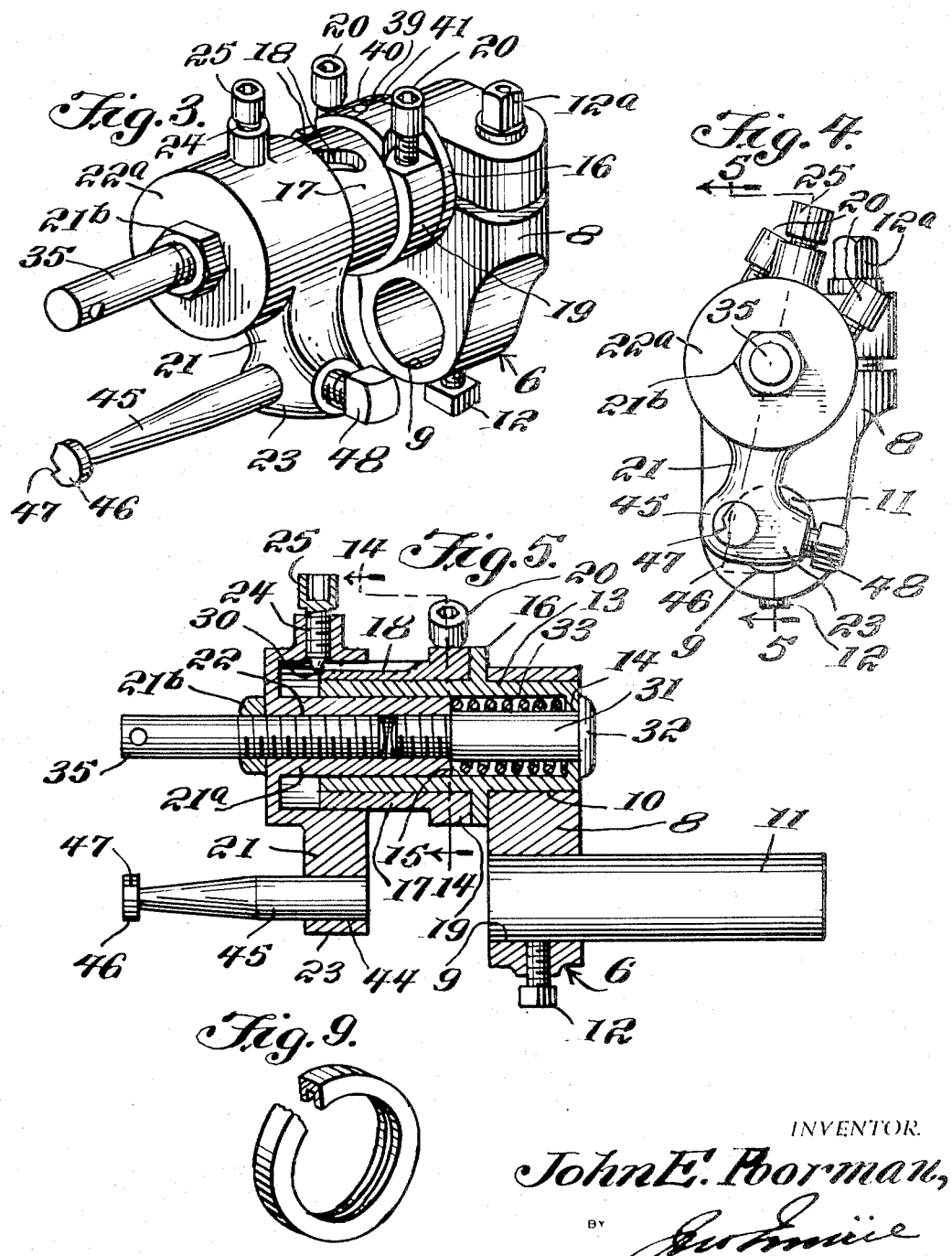

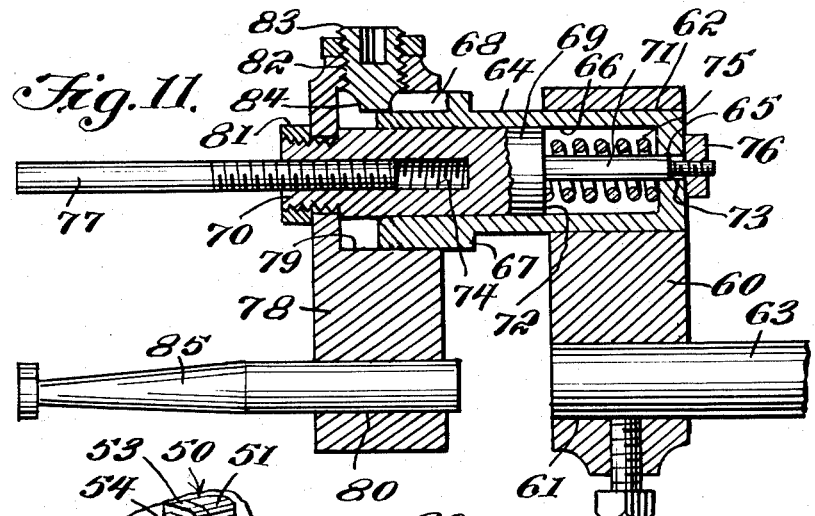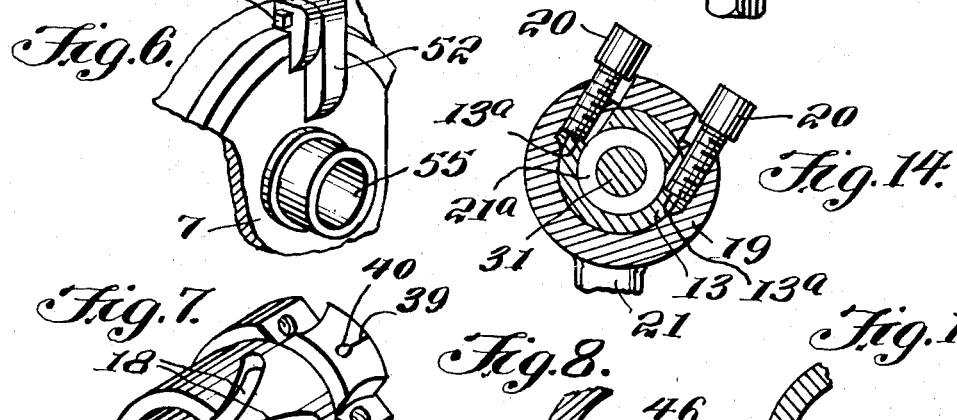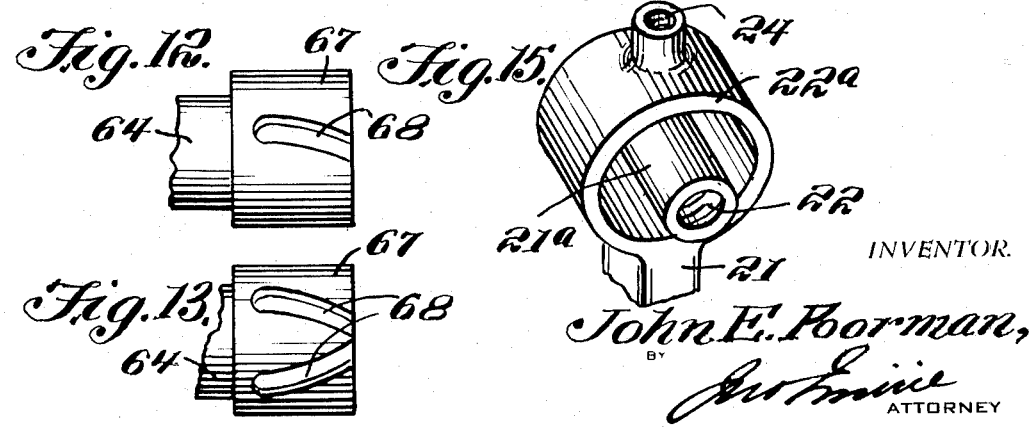

2,724,302

TOOL TO BE ATTACHED TO A SCREW MACHINE OR THE LIKE

John E. Poorman, Philadelphia, Pa.

Application March 10, 1953, Serial No. 341,587

6 Claims. (Cl. 82—1)

This invention relates to a tool to be attached to a screw machine or the like to form a groove or recess in a washer, sleeve or collar, and is a continuation-in-part of my copending application filed September 14, 1950, Serial No. 184,830, now abandoned.

The object of the invention is to provide a tool which can be readily attached to a screw or like machine to enter the interior of a tube or the bore in the end of a rod while making a washer, sleeve or collar, or to form a groove on the periphery of a tube.

A further object of the invention is to provide a tool which can be readily and conveniently attached to a screw or like machine to cooperate in the formation of an internal or external groove while manufacturing washers or collars.

A further object of the invention is to provide a tool which can be attached to a screw machine equipped to form collars or washers to provide such articles with an internal groove.

A further object of the invention is to provide a tool to be attached to a screw or like machine, provided with means for forming recesses or grooves of different depths on the interior or exterior wall of a washer or collar.

A further object of the invention is to provide a tool wherein a groove cutter can be advanced to enter a bore or tube, or on the outside of a tube, and stopped opposite where a groove is to be formed, while the body of the tool continues to advance toward the work to laterally swing the cutter against the surface where a groove is to be formed.

Another object of the invention is to provide a tool with a groove cutter, which, upon completion of a groove, the cutter is laterally swung away from the groove before said cutter is withdrawn from the bore or tube.

These and other novel features and objects will be hereinafter described and particularly pointed out in the claims.

In the drawings:

Figure 1 is a perspective view illustrating my invention diagrammatically applied to an ordinary screw machine, the tool and associated parts being shown prior to the beginning of the operation of forming a groove in the interior of a washer, collar, or other similar article.

Figure 2 is a side elevation diametrically showing the tool applied to a screw machine, the parts being shown in normal position in full lines, and in operative position in dotted lines.

Figure 3 is a detail perspective view of the tool.

Figure 4 is an end elevation of the tool.

Figure 5 is a central vertical section taken on the line 5—5 of Figure 4.

Figure 6 is a detail perspective view of the adjustable stop.

Figure 7 is a detail view of an adjustable sleeve having a cam to impart a crank-like movement to the cutting tool.

Figure 8 is a section to show the position of the cutter when first introduced in a bore in dotted lines and when moved in groove-cutting position in full lines.

Figure 9 is a detail view of a washer formed with an interior groove formed by the tool.

Figure 10 is a view similar to Figure 8 showing the tool positioned to cut a groove on the periphery of a tube.

Figure 11 is a section similar to Figure 5 showing a modification.

Figure 12 is a detail view of a sleeve used in the modification and formed with a cam groove.

Figure 13 is a detail view of the sleeve shown in Figure 12.

Figure 14 is a section on the line 14—14 of Figure 5.

Figure 15 is a detail perspective view of a main supporting sleeve.

Figure 16 is a perspective view of the work supporting sleeve.

1 represents diagrammatically parts of an ordinary screw machine, 2 a turret carried by a slide 3, including a rotative chuck 4, provided with the usual sockets 4a to receive tools of various kinds, in the present instance, a drill 5, and my improved groove-forming tool 6. In horizontal alignment with the center of the chuck 4 is the usual nose 7 of a work support, the work of course being rapidly rotated. These parts are timed and operated by the usual automatic devices to rotate the chuck and advance and retract the same, and form no part of the present invention.

For convenience, the term "washer" will be used to designate the article in the work support to receive an internal groove, although it is to be understood that the tool will form a groove in or on any ring-like article, such for instance, collars, common tube connections or sleeves.

The improved tool 6 comprises two parts, designated A and B.

Part A comprises a main support 8 formed at its lower end with a socket 9, and a clamp at its upper end formed with a socket 10. Fitted in the socket 9 is a bar 11 which fits in one of the sockets 4a in the chuck 4. This bar is securely held in the main support by a screw 12, and is subject to relative angular as well as longitudinal adjustment to set the tool in proper relation to the nose 7 of the work support.

Fitted in the upper socket 10 and secured by a clamp screw 12a is a sleeve 13 which is closed at one end except for a small bore 14 and an enlarged bore 15. The closed end of the sleeve 13 is mounted in the socket 10, and the open end portion projects beyond the support 8. A flange or collar 16 is formed on the sleeve 13 and bears against the main support 8, and in the wall of the sleeve are oppositely disposed recesses forming seats 13a. Mounted on the sleeve 13 and bearing against the collar 16 is an adjustable sleeve 17, having a pair of oppositely disposed inclined cam grooves 18 on the periphery of its free end and a flange 19 on its opposite end, said flange bearing against the flange 16. The sleeve 17 is radially adjustable on the sleeve 13 and is held in adjusted position by screws 20 which engage the seats 13a in the sleeve 13, the purpose of which will be later described.

21 indicates a tool support and includes a piston member 21a formed with a threaded bore 22 slidably and rotatably fitted in the sleeve 13; a hollow flange 22a which fits over the adjustable sleeve 17; and depending from this hollow flanged portion is a tool supporting member 23 which coincides with the main tool support 8. In the flange 22a is formed a screw threaded opening 24, in which is threaded a screw 25 formed at its lower end with a lug 30 to engage in one of the cam grooves 18 in the adjustable sleeve 17.

The cam grooves 18, as previously stated, incline away from each other with reference to the longitudinal axis of the sleeve 13 and form an important feature of the invention.

A screw 31 is passed through the small bore 14 of the sleeve 13 and is threaded to engage the inner end of the piston member 21, the head 32 of the screw bearing against the outer face of the sleeve 13, thus retaining the member 21 in the bore, at the same time limiting its outward movement. Interposed in the enlarged bore 15 of the sleeve 13, and confined between the closed end of said sleeve and the inner end of the piston member 21a, is a coiled spring 33 surrounding the screw 31. The tension of this spring tends to force the piston member outwardly beyond the open end of the sleeve 13, at which time the screw 25 is in the open end of one of the cam grooves 18 and is retained normally in this relation by said spring.

35 indicates a stop element in the form of an elongated screw, threaded in the threaded end of the bore of the piston member 21 and held in adjusted position by a nut 21b.

The flanged end of the tool support 23 is mounted on the adjustable sleeve 17, which in turn is mounted on the sleeve 13, the adjustable sleeve 17 being held in adjusted position on the sleeve 13 by the screws 20 which engage the seats 13a. Thus, the tool support 23 and the adjustable sleeve 17 are carried by the sleeve 13 of the main support 8. However, the tool support is biased with reference to the adjustable sleeve 17 by the spring 33, but is movable and limited in its movement on said adjustable sleeve 17 and in the bore 15 by the edge of the enlarged flange 22 engaging the flange 19.

On the flange 19 of the adjustable sleeve is a line 39, and opposite same is a zero sign 40, which registers with a line 41 on the flange 16 of the sleeve 13. When the two lines register, the cutter is in position to cut a slight groove, but if a deeper groove is desired, the screws 20 are released and the sleeve is given a slight turn, then the screws are tightened, which adjustment changes the throw of the cutter and thus a deeper groove is cut.

In the lower end of the crank-like tool support 23 is an opening 44 to receive the end of a recess or groove-forming cutter 45. The cutter extends outwardly from the crank-like support 23, and at its free end, it is provided with a head 46 sharpened to provide a cutting edge 47. The cutter 45 is adjustable angularly and longitudinally in the opening 41 and is held in adjusted position by a screw 48 fitted in a threaded opening in the crank-like support 23.

Part B of the tool comprises an open clamp 50 provided at one end with a lateral flange 51, from which depends a stop member 52 in alignment with the stopping element 35 when the parts are in assembled operative relation. The end of the clamp is formed with a flange 53 and extending through the latter flange and engaging a threaded opening in flange 51 is a locking screw 54 to secure the clamp to the nose 7 of the work support.

To bring about proper coordination of the parts A and B when the tool is operated, the axis of the tool support sockets are parallel and are substantially equidistant with the support means and socket axis of the main support.

In operation, a rod 55, for instance, is inserted in the work support, with its end extended beyond the nose 7. Then the chuck with a drill 5 is advanced by the turret to form a bore in the end of the rod in the usual way. The bore having been formed, the turret is withdrawn and the chuck is partially rotated to present the tool 6 in line with the work support, as shown in Figures 1 and 2. The turret is now advanced toward the work support until the stopping element 35 contacts with the stop member 52, which immediately stops the advance of the crank-like tool support 23. However, the advance movement of the main support continues for a short distance, which compresses the spring 33 and forces the piston member 21 into the bore 15 of the sleeve 13, which forces the head 32 of the screw 31 beyond the closed end of sleeve 13, and through one of the cams 18, the crank-like tool support 23 is slightly cranked to laterally move the cutting tool and its cutting edge 47 into contact with the inner wall of the bore, as shown in Figure 8. When the stopping element 35 engages the stop member 52, the cam acts to shift the cutting element laterally while the main support 8 is completing its advance movement. In the interval between the time the advance movement of the crank-like tool support is stopped and the advanced movement of the main support is stopped, the cam shifts the cutter from the groove in the bore. When the groove is finally formed and the movement of the chuck is reversed to withdraw the tool from the work, the main support 8 commences to withdraw before the crank-like support 23. In the interval, due to the spring sliding the piston member out of the bore 15 of the sleeve 13, and the head 32 of the screw up against the closed end of sleeve 13, the cam cranks said crank-like support and thus laterally moves the cutter away from and out of the groove to be withdrawn to normal position. By the time this occurs, through the timing and construction of the crank-like tool support and spring, the main support catches up with the crank-like support, and both said supports are returned together to normal position.

By providing cam grooves inclining in opposite directions, the parts can be adjusted so as to crank the tool support either to the right or left according to the rotation of the rod or tube from which the washers are formed.

In Figure 11, I have illustrated a modification of the tool, wherein the adjustable sleeve 19 is omitted and the parts are arranged somewhat differently but the cutting tool is operated to accomplish the desired result in substantially the same way as that previously described.

60 indicates a main support having at its lower end a socket 61 and a socket 62 at its upper end. Fitted in the socket 61 is a bar 63 which is subject to relative angular as well as longitudinal adjustment to set the tool in proper relation to the nose 7 of the work support.

Fitting in and secured in the upper socket 62 is a sleeve 64, which is closed at one end except for a small bore 65 and an enlarged bore 66 which is open at the end. A collar 67 surrounds the open end of the bore, and in the periphery of this collar is formed a cam groove 68. The closed end portion of the sleeve 64 is mounted in the socket 62 and the collar end portion protrudes from the main support. Mounted within the sleeve 64 is a piston member 69 which has a reduced externally threaded neck 70 at one end, and a reduced stem 71 at the other end, with radial shoulders 72 and 73 respectively formed by these reduced end portions. The piston member 69 also has an internally threaded bore 74 opening through the neck 70. The free end portion of the stem 71 is externally threaded and the piston member 69 is mounted in the sleeve 64 with the stem 71 extending through the bore in the end wall of the sleeve and with a coiled spring 75 interposed between the sleeve end wall and the shoulder 73 of the piston member. The action of the spring is selectively limited by a nut 76 threaded on the stem 71. Stop element 77 is threaded in the openings 74 and projects outwardly therefrom.

A crank-like tool support 78, which coincides with the main tool support 60, is provided at one end with a socket 79, and at the opposite end with a bore 80 which receives a recess or groove cutter 85. This tool support 78 is mounted on the sleeve 64 with the collar 67 fitted in the socket 79, and the neck 70 of the piston member 69 extends through the bore 65 in the bottom thereof. The crank-like main support 78 is secured against the shoulder 72 of the piston member 69 by a nut 81 threaded on the neck 70. Thus, the tool support is carried by the piston member 69 and is biased therewith by the spring 75 from the sleeve 64, but is movable on the collar 67 toward the sleeve until the end of the sleeve and collar are engaged by the bottom wall of the socket 79.

In the upper end of the tool support is a screw threaded opening 82, in which is threaded a screw 83 formed at its lower end with a lug 84 to engage in the cam groove 68 in the collar 67.

When using the modified form of the invention, part B, previously described, remains the same. Hence, when a rod is inserted in the nose of the work support and is drilled out, or if a tube is substituted for a rod, the chuck is adjusted to present the tool in line with the work support. The turret is now advanced until the rod 77 contacts with the stop 52, which immediately stops the advanced movement of the crank-like tool support 78. However, the advance movement of the main support continues for a short distance, which compresses the spring 75 and forces the piston member into socket 79, and through the cam 68, the crank-like tool support is slightly cranked to laterally move the cutter into working position to cut a groove, as previously described in connection with the preferred form of the invention.

The difference between the preferred form of the invention and the modified form is in the arrangement of parts for effecting the crank motion, and the fact that in the preferred form, different means are shown to regulate the extent of crank motion to cut grooves of different depth.

Figure 13 shows a pair of cam grooves on the collar 67 of different inclination with reference to the axis of the sleeve to cut a groove when the work holder is rotated in either direction, the sleeve 64 being adjustable to change the position of the cam with reference to the screw 83. In the preferred form of the invention, the main support is carried on a fixed sleeve, which carries an adjustable sleeve with the cam grooves. In this fixed sleeve operates the piston member which has a flange having a lug to engage the cam in the adjustable sleeve, whereas in the modification, the sleeve 64 is formed with the cam groove, and the tool support is formed with a socket to receive the cam end of the sleeve, and the piston member is adjustably secured to said main support.

The parts can be so timed that while the groove is being formed, or immediately after the groove is formed, a transversely arranged cutter 89 can be operated to cut off the bored end of the rod to complete the formation of a washer with an internal groove, as shown in Figure 9.

It is to be understood that the usual cams for turning the chuck and operating the turret will be so constructed, changed or added to to bring about the desired movement of the tool. However, it is not deemed necessary to illustrate the cams, as it is merely a question of re-arranging them to suit the distance traveled by the turret to fix the limit of movement of the cutter as compared with the movement of the drill.

Obviously, more than one tool can be set up on the chuck or tool holder, if desired, but for illustrative purposes, only one has been shown.

While I have shown the tool as adapted to form a groove on the inside of a bore or tube, it is not limited to this specific purpose. By adjusting the main support and the crank-like tool support, and if necessary, the stop member, the cutter can be positioned to cut a groove on the periphery of a tubular member, as shown in Figure 10.

In this figure, the cutting tool 46 is shown in full lines in cutting position to cut a groove 85 on the periphery of a tubular element, while in dotted lines, the cutter is shown in position moved laterally away from the tube.

The invention is simple and capable of use on practically all machines employing a turret and chuck. It can be readily and quickly applied and the usual cams adjusted or supplied to impart the desired movement.

While I have described the invention in connection with a screw machine employed to bore the end of a rod, it is evident that the improvement can be used to form interior and exterior grooves in the end of a tube which can be severed to form the washers.

What I claim is:

1. A tool for forming a groove on the inner or outer surface of a tube in a work piece and supportable by a chuck in relation to the work piece for relative movement toward each other, comprising a crank-like main support having means at one end which is adjustably attachable to the chuck, a crank-like tool support pivotally mounted at one end to the other end of said main support and slidably mounted in reference thereto, a groove cutter tool element projecting from the other end of the crank-like tool support and spaced from the pivotal connection with the main support for crank-like movement thereabout, an adjustable stop element projecting from the crank-like tool support for abutment with a stop adjacent the work piece, a spring interposed between the supports to normally force the crank-like tool support from the main support and toward the work piece, and cam means between said supports for cranking said tool element to working position about the pivotal connection between said supports as the tool element is stopped in relation to the work piece by abutment of said stop element with the work piece stop while relative movement between the work piece and said main support is continued in opposition to said spring.

2. A tool for forming a groove on the inner or outer surface of a work piece and supportable by a chuck in relation to the work support for relative movement toward each other, as defined in claim 1, wherein the crank-like tool support normally coincides with said main support and said groove cutter is substantially co-axial with said main support attachment means.

3. A tool for forming a groove on the inner or outer surface of a tube in a work piece and supportable by a chuck in relation to the work piece for relative movement toward each other, comprising a crank-like main support having means at one end which is adjustably attachable to the chuck, a crank-like tool support pivotally mounted at one end to the other end of said main support and slidably mounted in reference thereto, a groove cutter tool element projecting from the other end of the crank-like tool support and spaced from the pivotal connection with the main support for crank-like movement thereabout, an adjustable stop element projecting from the crank-like tool support for abutment with a stop adjacent the work piece, a spring interposed between the supports to normally force the crank-like tool support from the main support and toward the work piece, adjustable cam means between said supports, means for adjusting said cam means to cut grooves of different depths, means for securing the adjustment of the cam means, the cam means cranking said tool element to working position about the pivotal connection between said supports as the tool element is stopped in relation to the work piece by abutment of said stop element with the work piece stop while relative movement between the work piece and said main support is continued in opposition to said spring.

4. A tool holder of the type specified, comprising an elongated main support having transverse support means at one end and a transverse socket at the other end, a sleeve mounted in the transverse socket and extending outwardly therefrom, the sleeve having a bore co-axial with said socket, said main support means and said socket having parallel axes, a crank-like tool support including a piston slidable in said sleeve having means at its inner end passing through the bore to limit the sliding movement outwardly from the main support, a spring in the bore of said sleeve normally biasing said piston outwardly beyond said sleeve, the tool support including an enlarged cylindrical flange at its upper end and an extension depending from the flange having a transverse bore in its lower portion, an adjustable sleeve mounted on the first-mentioned sleeve, means for holding the adjustable sleeve in adjusted position, a cam groove formed on said adjustable sleeve, the enlarged cylindrical flange of the tool support fitting over the adjustable sleeve and having a slight rotative and slidable movement thereon, a radially disposed threaded bore formed in said enlarged cylindrical flange, a screw in said radial bore and having a cam following lug on the inner end which is inserted in said cam groove in the adjustable sleeve and a cutter mounted in the transverse bore in the lower end of the tool support, a stop rod threaded in the outer end of the piston parallel with the cutter, the stop rod engaging an abutment on a work piece to stop the advance of the tool support and through the cam and its follower crank the tool support and the cutting tool to cutting position while the main support continues to advance and stop during formation of a groove.

5. A tool for forming a groove on the inner or outer surface of a tube in a work piece and supportable by a chuck in relation to the work piece for relative movement toward each other, comprising a crank-like main support having means at one end which is adjustably attachable to the chuck, a sleeve extending outwardly from the main support, a crank-like tool support pivotally mounted at one end to the sleeve and slidably mounted in reference thereto, the tool support including a piston with an enlarged cylindrical flange at its outer end from which depends a portion with a bore, a cutting tool element fitted in the bore in the depending portion of the tool support and projecting therefrom and spaced from the pivotal connection with the sleeve for crank-like movement thereabout, an adjustable stop element projecting from the tool support for abutment with a stop adjacent the work piece, an adjustable sleeve-like cam mounted on the first-mentioned sleeve and fitting in the flange of the tool support, means on the flange engaging the adjustable cam, a spring between the end of the piston and the end wall of the sleeve to normally force the crank-like tool support from the main support and toward the work piece, means between the sleeve and the inner end of the piston to retain said piston in said sleeve under pressure of the spring, the cam cranking said tool element to working position about its pivotal connection with the main support as the tool element is stopped in relation to the work piece by abutment of said stop element with the work piece while relative movement between the work piece and said main support is continued in opposition to said spring.

6. A tool holder of the type described, comprising an elongated main support having transverse support means at one end and a transverse socket at the other end, a sleeve mounted in the socket end extending outwardly therefrom, the sleeve having a bore co-axial with said socket, said support means and said socket having parallel axes, a collar formed on the outer end of the sleeve, a piston member slidable in said sleeve and having a stem extending through said bore, a spring in said sleeve normally biasing said piston member outwardly beyond said collar, a nut threaded on said stem and limiting the spring movement of said piston member, a neck on the end of said piston member opposite said stem, an elongated tool support having a transverse socket at one end and a through bore co-axial with said socket, said tool support being mounted on said piston member with said neck inserted through said tool support bore and said collar fitted in said tool support socket, a nut threaded on said neck to secure said tool support thereon, a transverse tool socket in the free end of said tool support, said tool support sockets having parallel axes which are substantially equidistant with the support means and socket axes of said main support, a cam groove formed in said collar, a threaded bore in said tool support radial of the first-mentioned socket therein, a screw in said threaded bore and having a cam following lug on its inner end and which is inserted in said cam groove, a threaded bore in said piston member and opening axially through said neck, and a stop rod threaded in said latter threaded bore and protruding from said neck for engaging an abutment on the work piece to retract said piston member and tool support and thereby crank the tool support by movement of the follower thereon along the cam groove in the collar.

References Cited in the file of this patent
UNITED STATES PATENTS

| | | |
|---|---|---|
| 1,193,426 | Rollinson et al. | Aug. 1, 1916 |
| 2,341,277 | Larsson | Feb. 8, 1944 |